Figure 1:
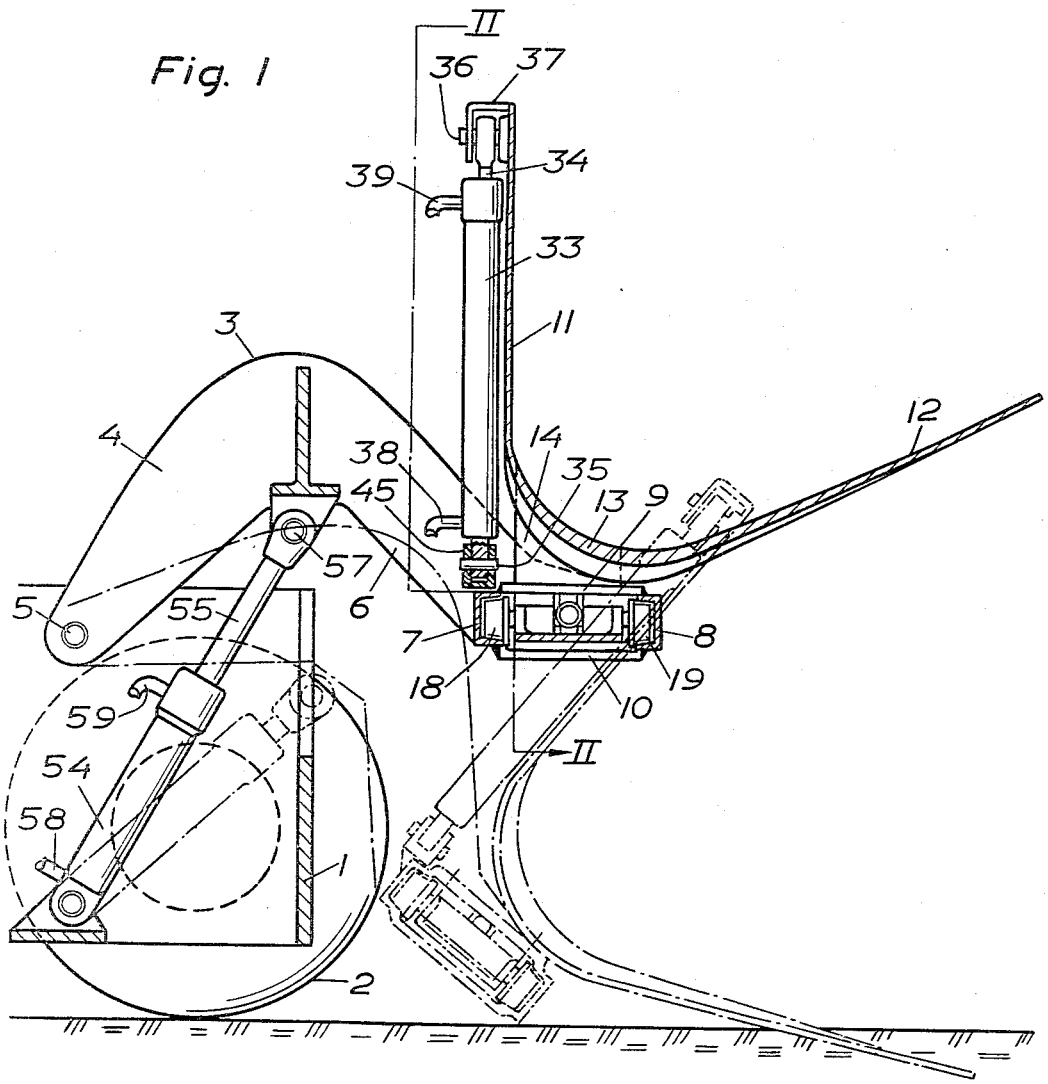

April 11, 1967 SVEN-ERIK NORE ERIKSSON 3,313,437
LOADER SHOVELS AND SHOVEL TILTING MEANS
Filed April 5, 1965 6 Sheets-Sheet 1

INVENTOR.
SVEN-ERIK NORE ERIKSSON
BY ERIC Y. MUNSON,
Attorney

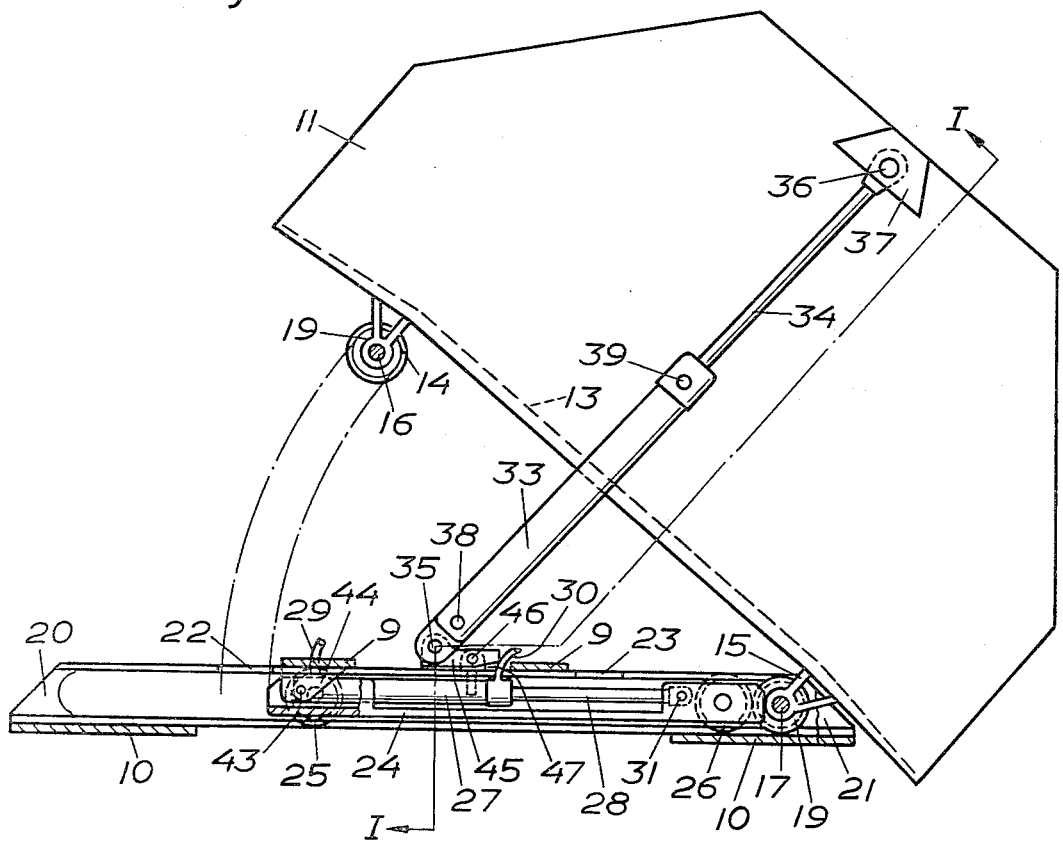

April 11, 1967  SVEN-ERIK NORE ERIKSSON  3,313,437
LOADER SHOVELS AND SHOVEL TILTING MEANS Filed April 5, 1965  6 Sheets-Sheet 3

INVENTOR.
SVEN-ERIK NORE E...
BY ERIC Y.

April 11, 1967  SVEN-ERIK NORE ERIKSSON  3,313,437
LOADER SHOVELS AND SHOVEL TILTING MEANS
Filed April 5, 1965  6 Sheets-Sheet 4

INVENTOR.
SVEN-ERIK NORE ERIKSSON
BY

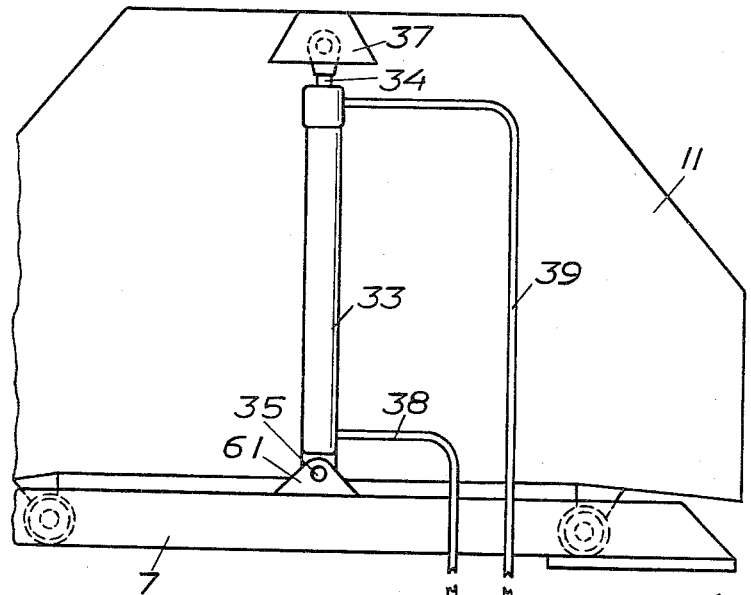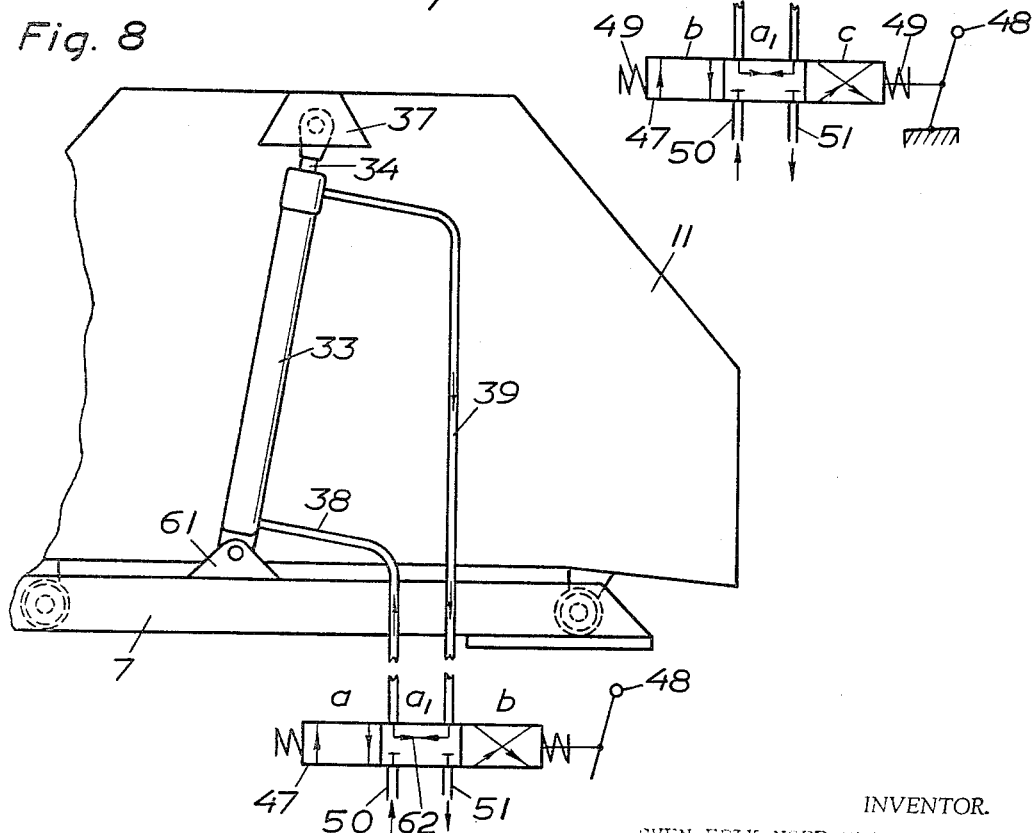

April 11, 1967 SVEN-ERIK NORE ERIKSSON 3,313,437
LOADER SHOVELS AND SHOVEL TILTING MEANS
Filed April 5, 1965 6 Sheets-Sheet 6

INVENTOR.
SVEN-ERIK
BY
ERIC Y. MUNSCH,
Attorney

United States Patent Office 3,313,437
Patented Apr. 11, 1967

3,313,437
LOADER SHOVELS AND SHOVEL TILTING MEANS
Sven-Erik Nore Eriksson, Adolfsberg, Sweden, assignor to Atlas Copco Aktiebolag, Nacka, Sweden, a corporation of Sweden
Filed Apr. 5, 1965, Ser. No. 445,616
13 Claims. (Cl. 214—768)

This invention relates to improvements in loader shovels and shovel tilting means particularly in connection with front loaders. One object of the invention is to provide a loader shovel for the above type of loaders which is easily filled with material and which has low weight and great resistance against damage during work. Loader shovels of this type are often used for loading loose rock or ore or coal or other blasted material which causes considerable wear on the shovel and which also produces great stresses in the shovel during operation. A further object of the invention is to produce a shovel tilting means which is of a very simple design and which permits the shovel to be locked in a central position and to be dumped to one or any side of the loader in side displaced positions. A still further object of the invention is to provide a shovel from which the material runs out rather successively so that the shovel is well fit for loading a belt conveyor.

For the above and other purposes I provide in a side dumping shovel structure for a front loader, a shovel, a shovel raising structure carrying said shovel, power means for moving said shovel from a low digging position to a raised discharged position, a bracket on said raising structure forming a transverse guideway, and two guide members on said shovel spaced apart sideways for guiding said shovel during motion from a locked central position to a side position in which the shovel may be dumped to said side. I also provide in combination a side dumping shovel for a front loader, a shovel, a shovel raising structure for moving said shovel from a low digging position to a raised dumping position, means for locking said shovel on to said raising structure against side dumping in a central position, means for moving said shovel sideways on said raising structure towards one side where material is to be dumped and to unlock the shovel from the raising structure for dumping towards said one side only, and power means on the raising structure for side dumping of the shovel. In a preferred embodiment of the invention I arrange said side dumping and locking means by providing a bracket on said raising structure forming a transverse guideway, two guide members on said shovel spaced apart sideways and arranged to guide said shovel in a transverse movement in said guideway from a neutral position in which side dumping is prevented selectively to a first side position in which the shovel may be dumped to the right side or to a second side position in which the shovel may be dumped to the left side and preventing in all positions front or rear tilting of the shovel relative to the bracket, power means on the bracket for moving the shovel sideways selectively from said neutral position to said first or second positions, respectively, and power means on said raising structure for dumping said shovel sideways into said first or second position, respectively.

Figure 4:
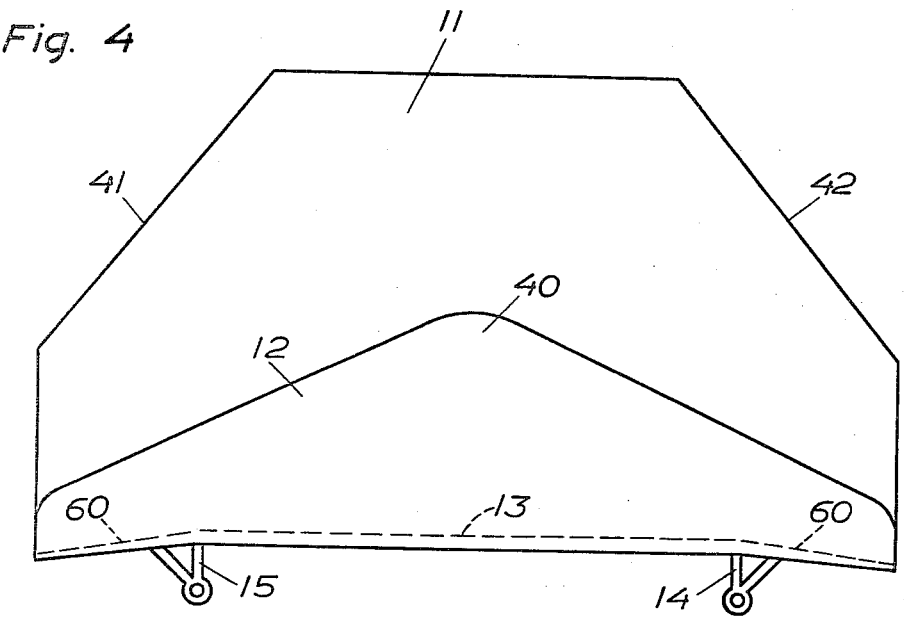
Figure 3:
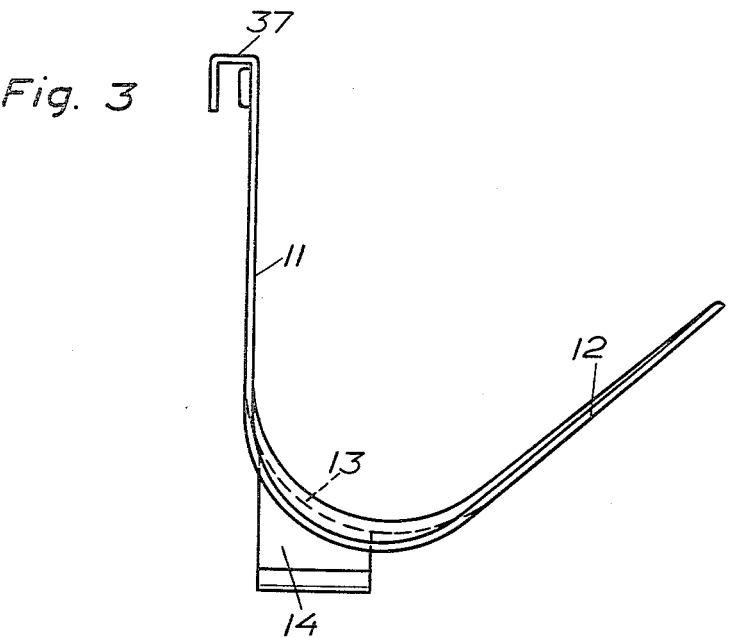

In the accompanying drawings three embodiments of shovel tilting means according to the invention and one embodiment of a shovel for a loader are illustrated by way of example. FIG. 1 is a partial longitudinal section and side view of the front end of a front loader provided with the shovel and tilting means according to the invention. FIG. 2 is a view and partial section substantially on lines II—II in FIG. 1 with the shovel tilted to the right. FIG. 3 is a side view of a shovel and FIG. 4 is a front view of a shovel according to the invention.

Figure 5:
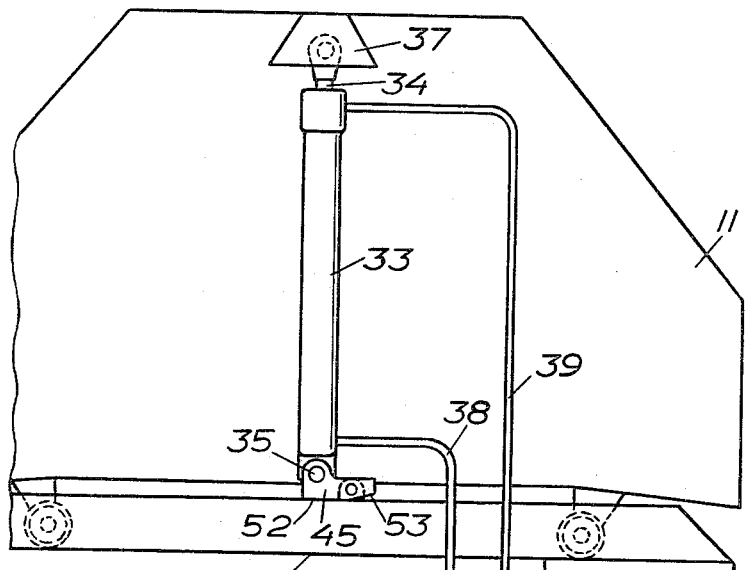
Figure 6:
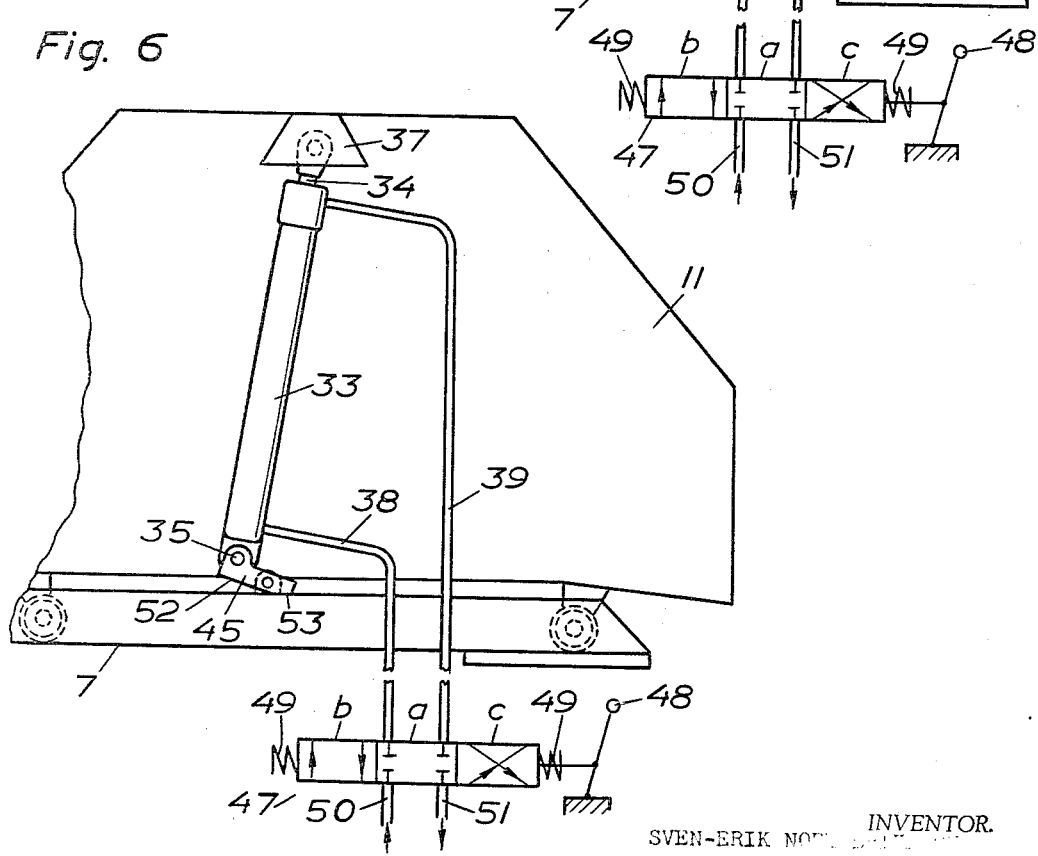

FIG. 5 is a partial rear view of the shovel and shows diagrammatically the operating means for the tilting cylinder. FIG. 6 is a similar view with the shovel displaced to the right. FIGS. 7, 8 and 9, 10 are similar views as FIGS. 5, 6 of two other embodiments of shovel operating structures.

Figure 10:
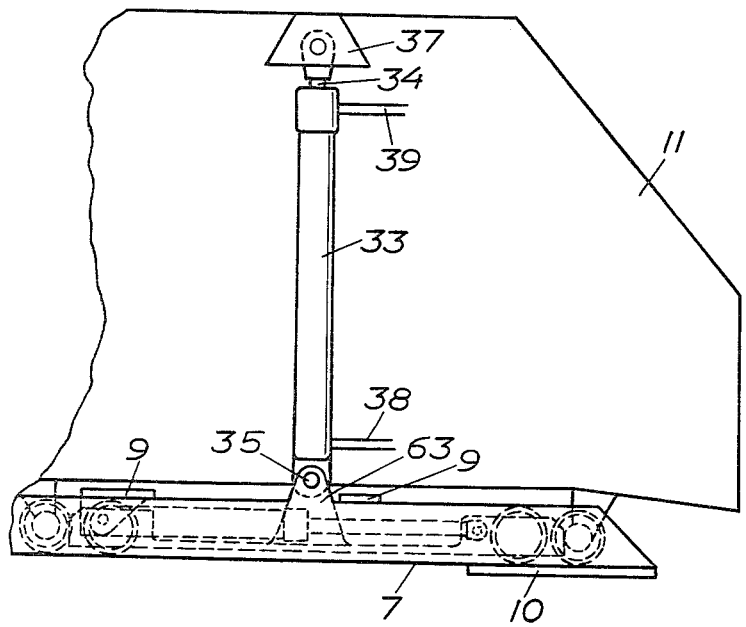

The shovel and tilting structures illustrated in the drawings and described in the following specification are particularly intended for front loaders of the type illustrated and described diagrammatically in connection with FIGS. 10–12 in David Gustavsson's and Sven-Erik Nore Eriksson's copending patent application Serial No. 445,417, filed Apr. 5, 1965, for "Improvements in Vehicle Substructures, Components Therefor and Vehicles Provided Therewith" filed concurrently herewith. However, shovels according to the invention may also be used in connection with loaders in which the shovel is lifted from a low digging position to a raised dumping position in front of a vehicle and is thereafter tilted in front of the vehicle.

In FIG. 1 the front end of a frame structure 1 for a loader vehicle is illustrated. 2 is one of the front wheels of said vehicle. A shovel raising structure is carried by the frame structure 1 and comprises an arm 3 of substantially inverted V-shape and of box construction pivotally mounted with one end of one shank 4 of the V-structure on a pivot 5 carried by the frame structure 1. The other shank 6 of the arm 3 carries at the free end two horizontal transverse channel members 7 and 8 which form transverse horizontal guideways and are connected one to the other by means of cross members 9, 10 welded to the channels 7, 8. The shovel is illustrated in FIG. 1 in full lines in raised position and in chain dotted lines in digging position.

The shovel consists of a rear wall 11 and a front wall 12 connected together by an arcuate bottom wall 13 so that the shovel in longitudinal cross section has the shape of a flaring U or V. The transverse contour of the shovel bottom 13 is slightly convex as obvious particularly from FIGS. 2 and 4. At the underside of the bottom wall 13 a pair of brackets 14, 15 are secured, said brackets being disposed a short distance from the sides of the shovel. The brackets 14, 15 are rotatably mounted on short shafts 16 and 17, respectively, which are directed longitudinally of the loader. The shafts 16, 17 carry pairs of wheels 18, 19 which are arranged to move on the flanges of the channels 7 and 8 within the channels so as to be guided in a transverse direction by said channels. At the ends of the channels, webs 20, 21 are provided between the flanges of the channels which form abutments or stops for the wheels 18, 19 so that said wheels cannot run out through the ends of the channels.

The upper flanges of the channels 7, 8 are provided with pairs of openings 22 and 23 which openings are just large enough to permit one pair of wheels 18, 19 to pass therethrough upwards when said pairs of wheels register with one of said pairs of openings. The transverse distance between the openings 22 and 23 is so much less than the transverse distance between the pairs of wheels 18, 19 on the brackets 14 and 15 that in neutral or central position of the shovel the wheels 18, 19 at both sides of the shovel are prevented from moving out through the openings 22 or 23, respectively. Consequently, in a neutral position of the shovel side tipping or side dumping of the shovel towards any side of the loader is prevented and the loader shovel is locked to the arm structure 3. Naturally, the shovel is always locked against front dumping by the channels 7, 8.

A transversely extending shoe 24 which is movable within the guideways provided by the channels 7, 8 has rollers 25, 26 rolling on the channel flanges, said shoe being long enough to extend from one bracket 14 to the other bracket 15 of the shovel. The shoe 24 may be displaced in the guideway by means of a hydraulic cylinder and piston 27, 28, the cylinder 27 of which is fixed in the guideway by a pivot pin 43 carried by a pair of lugs 44 welded to one of the members 9. The cylinder 27 is connected through pipes 29, 30 to a control valve and a source of hydraulic fluid (not illustrated). The cylinder 27 is double acting and the piston and piston rod 28 is connected by a pivot pin 31 to one end of the shoe 24. When pressure fluid is supplied to the hydraulic cylinder 27, for instance through the pipe 29 the shoe 24 is moved towards the right in FIG. 2 and thereby moves the shovel 11–13 from central position towards the right in FIG. 2 to an extreme right position in which the left pair of rollers 18, 19 are just below the opening 22 in the guideways 7, 8. A hydraulic cylinder and piston and piston rod 33, 34 is pivotally connected to the channels 7, 8 by a pivot 35 carried by a short lever 45 which is pivotally mounted on a pin 46 fitted in lugs 47 welded to the rear channel 7. The piston rod 34 is pivotally connected to the rear wall 11 of the shovel by a pivot 36 carried by a bracket 37. 38 and 39 indicate supply pipes for hydraulic fluid to the hydraulic cylinder 33. FIGS. 5 and 6 show somewhat diagrammatically the arrangement and function of the cylinder and piston 33, 34 when the shovel is moved from central position in FIG. 5 to the right hand position in FIG. 6 and these figures also show the hydraulic circuit for cylinder 33. 47 is a control valve which may be operated by a handle 48 against the action of springs 49 from a position $a$ to any of the positions $b$ or $c$. Hydraulic pressure fluid is supplied from a source (not illustrated) through a pipe 50 and returned through a pipe 51. The pipe or hose 38 leads to the lower end and 39 to the upper end of cylinder 33. The lever 45 has an abutment surface 52 which forms a blunt angle with another abutment surface 53 and in central position of the shovel the abutment surface 52 rests on the flange of the channel 7. Now, if cylinder 27 is operated so that the shovel moves towards the right as in FIG. 6 then cylinder 33 which cannot expand due to the neutral position $a$ of valve 47 tilts to the position in FIG. 6 so that lever 45 abuts the flange of channel 7 with the surface 53.

It is obvious that when the shovel has been moved to the right in FIGS. 2 and 6 movement of valve 47 to position $b$ supplies hydraulic fluid through the pipe 38 to the cylinder 33 which will expand and dump the shovel to the right and during this movement the left hand pair of wheels 18, 19 of the shovel move out through the opening 22 in the channels 7, 8 as indicated in chain dotted lines in FIG. 2. The pair of wheels 18, 19 carried by the shaft 17, however, in this position rests against the abutment web 21 in which position these wheels are locked in the guideway formed by the channels 7, 8 near the abutment 21. The above described movement of the shovel involves a displacement towards the dumping side of the loader before dumping and this has the effect that the shovel dumps its contents farther away to the side of the loader than in loaders in which the shovel is tilted to a side on fixed pivot. The convex bottom line 13 of the shovel causes the material in the shovel to slide out gradually from the shovel so that it is easier with this shovel to evenly fill a running belt conveyor at the side of the loader. When the handle 48 moves valve 47 to position $c$ the hydraulic cylinder 33 is contracted so that the shovel returns from the position in FIG. 2 to the position in FIG. 6. Contraction of cylinder 27 returns the shovel to central position as in FIG. 5.

If it is desired to dump the shovel to the left in FIG. 2 the shovel when in horizontal position is first moved by means of the shoe 24 to the left. The pair of wheels 18, 19 carried by the shaft 16 then move towards the abutment 20 and the pair of wheels 18, 19 carried by the shaft 17 move into register with the opening 23 so that expansion of the cylinder 33 will dump the shovel towards the left in FIG. 2.

Movement of the shovel from the raised full line position in FIG. 1 to the digging position illustrated in chain dotted lines is carried out by means of a hydraulic cylinder and piston 54, 55 which is pivotally connected to the frame 1 by a pin 56 and to the arm 3 by a pin 57. Hydraulic pressure fluid is supplied to the cylinder 54 from a control valve and source of pressure fluid (not illustrated) through hoses 58, 59. The control valve may be of the same type as valve 47 and a similar control valve may control cylinder 27, and all valves may be grouped on the frame 1 in a position which is easily reached by an operator. When the shovel is in digging position the loader is moved towards the material pile so that the shovel is filled and simultaneously the shovel is raised by the cylinder 54 and arm 3 to dumping position.

FIGS. 3 and 4 illustrate the shovel 11, 12, 13 separately and it is obvious that the inner transverse bottom line of the shovel is convex so that the bottom 13 has a high central portion and side portions 60 sloping towards the open sides of the shovel. The front wall 12 of the shovel forms a digging lip 40 which is rather thin and has great ability to penetrate a pile of material. The rear wall 11 of the shovel is cut down at the sides as indicated at 41 and 42 so that the maximum height of the shovel in dumped position is reduced as obvious from FIG. 2 and the necessary head room for the loader in a mine or other underground space is thereby reduced. The walls 11, 12, 13 of the shovel are of smooth and even shape and rather thin and consequently the shovel will yield elastically under load which has been found to be of advantage since it enables the shovel to be made lighter and the stresses to be reduced. When desired the shovel may of course be provided with side walls in order to increase the capacity when the shovel is used for handling light material. Such side walls may be arranged for automatic opening upon dumping of the shovel towards one side or the other in a manner very often used in so called Granby cars or as illustrated in connection with FIGS. 4 and 5 of the above mentioned copending application of David Gustavsson and Sven-Erik Nore Eriksson.

Figure 9:
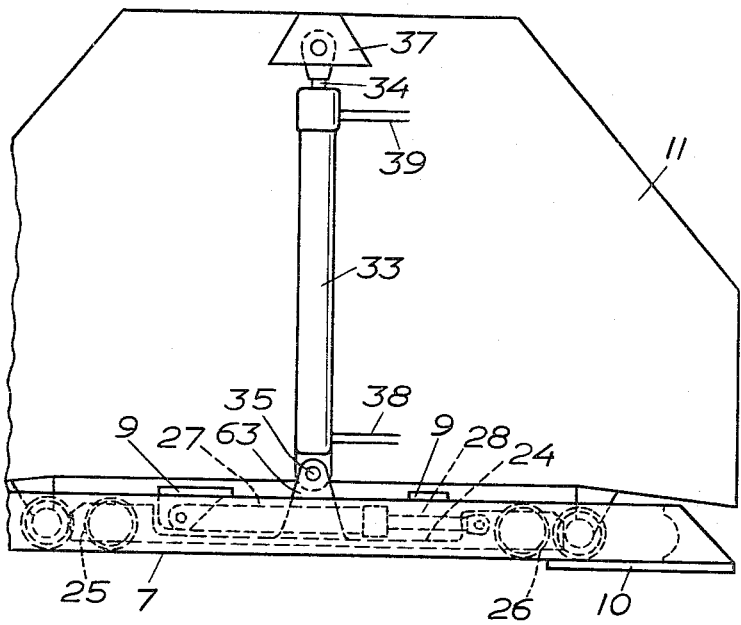

It should be observed that shovels of the design illustrated in FIGS. 2, 3 and 4 may also be used in connection with front loaders with forwardly tilting shovels. The embodiment of the invention above described and illustrated in the drawings should only be considered as an example and may be modified in several different ways within the scope of the claims. FIGS. 7 and 8, for instance, show a modified arrangement of the dumping cylinder 33 and valve 47. The cylinder 33 is here pivotally connected through the pivot pin 35 to a pair of lugs 61 welded to the upper flange of the channel 7. When the shovel in FIG. 7 is moved to the right side as shown in FIG. 8 the cylinder 33 must be able to expand and for this purpose the neutral position $a_1$ of the valve 47 provides an overflow communication 62 so that the length of the cylinder 33 is not locked in the position $a_1$ of valve 47. In other respects this embodiment is constructed in the same way as the embodiment in FIGS. 1–6 and the same reference numerals have been used to designate equivalent parts which are not described again. In the embodiment of FIGS. 9 and 10 the dumping cylinder 33 is pivotally connected through pin 35 to two lugs 63 welded to the shoe 24 and extending upwards one on each side of the side displacement cylinder 27 between the cross members 9, 9. Side movement of the shovel in the guideways 7, 8 in this embodiment does not change the necessary length of cylinder 33 as obvious from FIG. 10 and the same control valve 47 as in FIGS. 5 and 6 may therefore be used for controlling fluid flow to and from dumping cylinder 33. The same reference numerals are used in FIGS. 9 and 10 as in FIGS. 1–6 to indicate equivalent parts.

What I claim is:

1. In a side dumping shovel structure for a front loader, a shovel, a shovel raising structure carrying said shovel, power means for moving said shovel from a low digging position to a raised discharge position, a bracket on said raising structure forming a transverse guideway, two guide members on said shovel spaced apart sideways and arranged to guide said shovel in a transverse movement in said guideway from a neutral position in which side dumping is prevented selectively to a first side position in which the shovel may be dumped to the right side or to a second side position in which the shovel may be dumped to the left side and preventing in all positions front or rear tilting of the shovel relative to the bracket, power means on the bracket for moving the shovel sideways selectively from said neutral position to said first or second positions, respectively, and power means on said raising structure for dumping said shovel sideways into said first or second position, respectively.

2. In a side dumping shovel structure for a front loader, a shovel, a shovel raising structure carrying said shovel, power means for moving said shovel from a low digging position to a raised discharge position, a bracket on said raising structure forming a transverse guideway, two guide members on said shovel spaced apart sideways and movable in said guideway, each said member forming a means on which the shovel is swingable on the bracket to a side dumping position, a shovel displacing shoe movable in the guideway to displace said guide members from a neutral position in which the guide members are locked to the guideway against side swinging to a first position in which one guide member is swingable out from the guideway upon side swinging of the shovel on the other guide member and to a second position in which the other guide member is swingable out from the guideway upon side swinging of the shovel on said one guide member, power means for selectively moving said shoe from neutral position to said first or second positions, respectively, and power means on said raising structure for dumping the shovel sideways.

3. A side dumping shovel structure according to claim 1, in which the guideway consists of two channels fixed together and to the shovel raising structure, two pairs of guide rollers mounted on the shovel below the bottom adjacent each side of the shovel and arranged to roll and to be guided in said channels, two ports in said channels permitting said pairs of rollers to move out of the channel upwards when in register with said ports, the transverse distance between said ports being different from the transverse distance between said pairs of rollers so that one roller pair only can move out through its pertaining port while the other roller pair is trapped in the channels.

4. A side dumping shovel structure according to claim 3, in which the transverse distance between the ports is less than the transverse distance between the pairs of rollers.

5. In a side dumping shovel structure for a front loading vehicle, a vehicle frame structure, a shovel having a transverse cross section longitudinally of said vehicle frame structure substantially in the shape of a flaring U open towards the sides, a shovel raising arm structure of substantially inverted V-shape pivotally mounted with one end of the shanks on transverse pivoting means on the frame structure and having the other shank pointing down in front of the frame structure, two channels fixed to the end of said other shank of said shovel raising arm structure to form a transverse guideway, a power cylinder and piston pivotally attached to the vehicle frame structure and to a point adjacent the apex of the V-shaped arm structure for raising the shovel from digging to dumping position, two pairs of guide rollers mounted on the shovel below the bottom adjacent each side of the shovel and arranged to roll and to be guided in said channels, two ports in the channels at a transverse distance less than the transverse distance between the pairs of rollers to permit one pair of rollers at a time to move out of the guideway through one of said ports in side dumping movement of the shovel, a side moving power cylinder and piston connected to the guideway and cooperable with the shovel for side displacement of the shovel, and a dumping cylinder and piston connected to the guideway and the shovel for side dumping of the shovel.

6. A side dumping shovel structure according to claim 5, in which the side dumping cylinder and piston is connected to the guideway through a lever movable on the guideway between two limiting positions to provide a certain lost motion between the shovel and the guideway.

7. A side dumping shovel structure according to claim 5, in which a shoe is disposed and movable in the guideway for displacement of the shovel to one side of the loader, and in which the side dumping cylinder and piston is connected to said shoe.

8. A side dumping shovel structure according to claim 5, in which the side dumping cylinder is hydraulically connected to a valve, said valve having an overflow passage which in neutral position of the valve connects the two ends of the dumping cylinder.

9. In a side dumping shovel structure for a front loader, a shovel, a shovel raising structure carrying said shovel, power means for moving the shovel from a low digging position to a raised discharge position, means for locking the shovel on to said raising structure against side dumping, means for guided movement of the shovel sideways on the raising structure towards one side where material is to be dumped, means for unlocking the shovel from the raising structure by said guided sideways movement for dumping towards said one side only, and means on the raising structure for side dumping of the shovel.

10. A side dumping shovel structure according to claim 9, in which the shovel raising structure comprises two substantially inverted V-shape arms pivotally mounted with one end of the one shank to swing on a transverse axis on a frame structure and having the other shank pointing down in front of the frame structure, the shovel having a bottom wall and being mounted for pivoting sideways at the end of said other shanks but locked against pivoting endwise relative to said shanks, the power means for swinging the arm structure being arranged to swing the shovel from a low digging front position with said bottom wall substantially parallel to the ground to a raised position.

11. A side dumping shovel structure according to claim 9, in which the shovel has a transverse cross section longitudinally of the loader substantially in the shape of a flaring U open at least towards one side and with an inner bottom line transversely to the loader which is slightly convex.

12. A front loader vehicle according to claim 9, in which the power means for swinging the arm structure is a power cylinder and piston pivotally attached to the frame structure and a point adjacent the apex of the V-shaped arm structure.

13. A shovel for a front loading vehicle according to claim 9 and having a transverse cross section longitudinally of the vehicle substantially in the shape of a flaring U open at least toward one side, and having a pair of brackets at the underside of the bottom adjacent the apex of the U, said brackets being situated near the sides of the shovel and forming bearings for guide roller shafts extending longitudinally of the shovel.

References Cited by the Examiner

UNITED STATES PATENTS

| | | |
|---|---|---|
| 2,585,095 | 2/1952 | Daniels. |
| 2,924,345 | 2/1960 | Bodin. |
| 3,139,201 | 6/1964 | Rolfees. |
| 3,171,554 | 3/1965 | Griffith. |
| 3,203,565 | 8/1965 | Keskitalo. |

HUGO O. SCHULZ, *Primary Examiner.*